United States Patent [19]

Urban et al.

[11] Patent Number: 4,717,605

[45] Date of Patent: Jan. 5, 1988

[54] RADIATION CURABLE ADHESIVES

[75] Inventors: Manfred Urban, Weiterstadt; Jörg Ohngemach, Reinheim, both of Fed. Rep. of Germany

[73] Assignee: Merck Patent Gesellschaft mit beschrankter Haftung, Darmstadt, Fed. Rep. of Germany

[21] Appl. No.: 734,722

[22] Filed: May 16, 1985

[30] Foreign Application Priority Data

May 16, 1984 [DE] Fed. Rep. of Germany ....... 3418149

[51] Int. Cl.$^4$ .............................................. C09K 19/00
[52] U.S. Cl. .......................................... 428/1; 156/64; 156/99; 156/273.5; 156/275.7; 156/330; 428/415; 522/25
[58] Field of Search .................... 156/273.5, 275.7, 99, 156/330, 64; 428/1, 415; 522/25

[56] References Cited

U.S. PATENT DOCUMENTS

| | | | |
|---|---|---|---|
| 4,227,978 | 10/1980 | Barton | 522/25 |
| 4,250,053 | 2/1981 | Smith | 522/25 |
| 4,401,537 | 8/1983 | Chern et al. | 428/1 |
| 4,425,171 | 1/1984 | Oosaka et al. | 156/64 |
| 4,428,807 | 1/1984 | Lee et al. | 522/25 |
| 4,474,839 | 10/1984 | Takamatsu et al. | 428/1 |

*Primary Examiner*—John J. Gallagher
*Attorney, Agent, or Firm*—Millen & White

[57] ABSTRACT

Radiation curable adhesives which are based on ionically polymerizable epoxide systems and ionic photoinitiators of the triarylsulfonium complex salt type additionally also contain at least one ethylenically unsaturated substance which can be polymerized by free radicals and at least one free radical photoinitiator. These exhibit particular advantages in the gluing of optical glass components. The gluing can be partially hardened with UV radiation until fixing of the glass components is achieved. In this partially hardened state, the components can be adjusted. Complete hardening is then carried out with UV radiation.

16 Claims, No Drawings

RADIATION CURABLE ADHESIVES

BACKGROUND OF THE INVENTION

This invention relates to radiation curable adhesives and a process for gluing optical glass components using these adhesives.

For gluing optical glass components, for example, optical lenses or, in particular, also glass plates in the production of liquid crystal display cells, it is necessary to have available adhesives which are suitable for this purpose. It should be possible to harden such adhesives in the minimum amount of time in order to avoid long fixing times of the components during the gluing operation. The hardened glue should be transparent, have a high mechanical strength and be resistant towards weathering influences. In the case of the liquid crystal display cells, it should also be resistant towards the contents of the liquid crystal cells.

These properties are currently best fulfilled by adhesives which can be hardened by radiation and are based on ionically polymerizable epoxide systems and ionic photoinitiators of the triarylsulfonium complex salt type. Corresponding compositions which can be hardened by radiation are known, for example, from U.S. Pat. Nos. 1,516,511; 1,516,512; 4,058,401; 4,138,255; 4,161,478; 4,173,476; 4,186,108 and 4,218,531 and many other publications. The use of such compositions for gluing glass plates, optical lenses or liquid crystal display cells is moreover described in German Offenlegungsschriften DE-OS No. 2,518,652 and DE-OS No. 2,904,626 and in U.S. Pat. No. 4,297,401.

For optical glass components, such as lenses or liquid crystal display cells, especially if these are to be produced with high precision, it is necessary that they can be adjusted during gluing, that is to say can be brought into their exact position relative to one another. Adjustment before, after or, most advantageously, during the gluing operation should be possible. With state of the art adhesives which can be hardened by radiation— their typical exposure times required for hardenng are in the range from seconds to a few minutes—it is not possible to correct the position during or after gluing. The hardening time may be too short, or the adhesive layer is thereby irreversibly destroyed when it has not yet completely hardened, or the components are moved back again to the starting position by the partially hardened adhesive after their position has been corrected. When such adhesives are used, adjustment of the component to be glued is only possible before the hardening by radiation, expensive adjustment equipment being required while the components are brought together and held in the exact position.

Ester/ether optical adhesives which can be hardened by light and are based on certain dioxolanylmethyl(-meth)acrylates, and which contain both photoinitiators which form free radicals and cationic photoinitiators and which can therefore be polymerized step-wise, are described in German Offenlegungsschrift No. 3,323,733. It is said to be possible, using such adhesives, initially to fix optical components by UV radiation and then to harden the gluing by heat treatment or further UV irradiation. These materials also do not yet fulfill the current requirements of an efficient optical adhesive. On the one hand, relatively long irradiation times are required for the partial hardening—typically 30 to 120 seconds and very long heating times of about 5 hours or subsequent irradiation times of 2 to 10 minutes are required for complete hardening. On the other hand, the position of the fixed glass components can be corrected only by heat treatment or by dissolving or partial swelling with the aid of solvents. The time span for adjustment in the pre-hardened state is also limited to about 5 to 6 minutes.

SUMMARY OF THE INVENTION

It is thus an object of this invention to provide radiation curable adhesive which allow problem-free adjustment, during the gluing operation, of the components to be glued.

Upon further study of the specification and appended claims, further objects and advantages of this invention will become apparent to those skilled in the art.

Surprisingly, it has been found that these objects are achieved using radiation curable adhesives which are based on ionically polymerizable epoxide systems and ionic photoinitiators of the triarylsulfonium complex salt type, and which additionally also contain at least one ethylenically unsaturated substance which can be polymerized by free radicals and at least one free radical photoinitiator. Gluings with such adhesives can be partially hardened with UV radiation until fixing of the glass components is achieved. The partially hardened state can be retained for at least 24 hours; the components to be glued can be adjusted within this period without problems, and without the adhesive layer being destroyed or the components being moved back into their starting position. The gluing can be completely hardened by further UV radiation.

The invention thus relates to radiation curable adhesives which are based on ionically polymerizable epoxide systems and ionic photoinitiators of the triarylsulfonium complex salt type, these additionally also containing at least one ethylenically unsaturated substance which can be polymerized by free radicals and at least one free radical photoinitiator.

The invention furthermore relates to a process for gluing optical glass components, wherein a radiation curable adhesive of this invention is introduced between these components, the gluing being partially hardened with UV radiation, the glass components being adjusted and the gluing then being hardened completely with UV radiation.

The invention moreover relates to the use of the radiation curable adhesives according to the invention, for gluing optical glass components.

DETAILED DISCUSSION OF THE INVENTION

Ionically polymerizable epoxide systems such as are contained in the radiation curable adhesives according to the invention, are materials which contain ionically polymerizable and/or crosslinkable epoxide groups (oxirane ring structures). Such epoxide materials can include any desired monomeric, dimeric, oligomeric or polymeric epoxides, which contain one, several or a large number of epoxide equivalents per mole. These epoxides can be aliphatic, cycloaliphatic, aromatic or heterocyclic. Oligomeric and polymeric epoxide materials can be uniform or can be built up from various comonomers; their molecular weight can vary within wide ranges. It is common to all these compounds that they can undergo acid-catalyzed, preferably with the aid of Lewis acid catalysts, polymerization reactions via opening of the oxirane ring. These materials are used individually or as a mixture as so-called epoxy resins or are processed to form these. These epoxy resins are familiar to the expert or can be found without problems in the prior art, for example, the publications mentioned above by way of example. A large number of these materials is commercially available. Unless indicated otherwise herein, this aspect of the invention is fully conventional, e.g., as disclosed in the mentioned references.

Examples of substances which are suitable for the preferred purpose according to the invention are low molecular weight epoxides, such as glycidol and epichlorohydrin, alkenyl oxides, such as propylene oxide, butadiene oxide and styrene oxide, glycidyl ethers and esters, such as phenyl glycidyl ether, allyl glycidyl ether, bisphenol A diglycidyl ether and glycidyl acrylate and methacrylate, compounds containing cyclohexene oxide groups, such as 1,2-cyclohexene oxide and vinylcyclohexene oxide or dioxide, 3,4-epoxycyclohexylmethyl 3,4-epoxycyclohexanecarboxylate and bis-(3,4-epoxy-6-methylcyclohexylmethyl) adipate, and similar compounds. Suitable higher molecular weight to polymeric materials are oligomeric to polymeric epoxide acrylates and methacrylates, such as glycidyl acrylate and glycidyl methacrylate of any desired degree of polymerization or copolymers of these compounds with other vinyl monomers, epoxidized polymers and resins, such as epoxidized phenol/formaldehyde novolak resins, epoxidized polyenes, polyesters, polyurethanes and siloxane resins, which can be obtained, for example, by reaction or modification of the base polymer substance with epichlorohydrin.

For radiation curable compositions which can be used as adhesives, these epoxide systems require ionic photoinitiators which release Lewis acids under the action of high-energy radiation, such as UV light or electron beams, polymerization or crosslinking, hardening of the epoxide material occurring as a result of this.

Ionic photoinitiators of the triarylsulfonium complex salt type are particularly suitable for this purpose. Such photoinitiators are known, for example, also from the publications mentioned above by way of example, in which numerous of these onium salt photoinitiators and their preparation and use for the hardening of epoxide materials by radiation are described.

The triarylsulfonium complex salts which are particularly suitable for the preferred use according to the invention are composed of sulfonium cations which carry 3 aromatic radicals, and halogeno complex anions, for example, of the elements boron, aluminum, nitrogen, phosphorus, arsenic, antimony and bismuth. The aromatic radicals of the triarylsulfonium cations are preferably phenyl, biphenyl, naphthyl, tolyl, benzyl and phenacyl, which can also be substituted, for example, by alkyl, alkoxy, aryl, aryloxy, arylthio, hydroxyl or halogen. The three radicals of the sulphur can be identical or different. Particularly preferred radicals are phenyl, phenacyl and 4-(phenylthio)-phenyl.

Halogen in the halogeno complex anions can chiefly be fluorine, chlorine and bromine, in particular fluorine and chlorine. Preferred complex anions are tetrafluoborate, hexafluorophosphate, hexafluoroarsenate and hexafluoroantimonate. These ionic photoinitiators are known to the expert; they are commercially available or can easily be prepared by processes according to the state of the art.

According to the invention, the radiation curable adhesives contain at least one ethylenically unsaturated substance which can be polymerized by free radicals.

Virtually all the ethylenically unsaturated monomers, oligomers or polymers which contain at least one ethylenic double bond equivalent per mole are suitable for this. These are preferably monomeric or oligomeric vinyl, acrylic or allyl compounds. These include, for example, monomeric vinyl, acrylic and allyl compounds such as vinyl acetate, styrene, acrylic and methacrylic acid and esters thereof, such as methyl acrylate, methyl methacrylate and pentaerythritol triacrylate, and vinyl and allyl ethers, such as pentaerythritol trivinyl and triallyl ether. Possible higher molecular weight unsaturated substances are acrylated epoxy resins, acrylated polyesters and polyurethanes and acrylated siloxane resins. Such substances and similar ethylenically unsaturated materials are known to the expert as being polymerizable by free radical photoinitiators, for example by German Offenlegungsschriften DE-OS No. 2 722 264 and DE-OS No. 3 010 148.

Preferred ethylenically unsaturated substances which can be polymerized by free radicals and are present in the radiation curable adhesives according to the invention are methyl methacrylate, pentaerythritol triacrylate and oligomeric acrylated epoxy resins.

According to the invention, at least one free radical photoinitiator is also added to the radiation curable adhesives. In principle, all photoinitiators which release free radicals which trigger off polymerization reactions when irradiated can be employed. These include essentially aromatic keto compounds, in particular those of the group comprising benzophenones, hydroxyalkylphenones, dialkoxyacetophenones, benzoin ethers, benzil ketals and thioxanthones. Examples of suitable compounds thus include benzophenone or substitution products thereof, substituted hydroxyalkylphenones, which also include derivatives thereof which are alkyl- and acyl-substituted on the OH group, dimethoxy- and diethoxy-acetophenone, benzoin methyl and ethyl ether, benzil dimethyl and diethyl ketal and alkyl- and halogen-substituted thioxanthones. Such free radical photoinitiators are known or can be found without problems from the relevant state of the art, as is outlined, for example, by German Offenlegungsschriften DE-OS No. 2,722,264, DE-OS No. 2,808,459, DE-OS No. 3,010,148 and DE-OS No. 3,037,831. Particularly preferred free radical photoinitiators of this type are benzophenone, 1-phenyl-2-hydroxy-2-methyl-propan-1-one, 1-(4-isopropylphenyl)-2-hydroxy-2-methyl-propan-1-one, 1-(4-chlorophenyl)-2-hydroxy-2-methyl-propan-1-one, 1-(4-dodecyclphenyl)-2-hydroxy-2-methyl-propan-1-one, diethoxyacetophenone, benzoin ethyl ether, benzil dimethyl ketal, 2-isopropylthioxanthone, 2-chlorothioxanthone or 2-dodecylthioxanthone.

The radiation curable adhesives according to the invention can be prepared in an entirely conventional manner by simple mixing of the components, which are liquid in the majority of cases, of epoxy resin(s), ethylenically unsaturated substance(s), ionic photoinitiator and free radical photoinitiator(s). Components in the form of solids are dissolved or homogeneously incorporated in the liquid components. If appropriate, it may also be advantageous to incorporate minor amounts of a suitable solvent for the solid substance or solid substances or first to dissolve the solid substances therein.

The proportion of the individual constituents in the adhesive composition can be varied within wide ranges and are not particularly critical. Thus, in respect of the ratio of ionically polymerizable epoxide system to ethylenically unsaturated substance which can be polymerized by free radicals, the latter can be present in an amount of 5 to 50% by weight, preferably about 10% by weight of the former.

Suitable ratios between the particular type of resin and the corresponding photoinitiator can be found in the relevant state of the art. As a rule, 1 to 10% by weight, preferably 2 to 5% by weight, of triarylsulfonium complex salt initiator, based on the epoxide system, is adequate. Based on the ethylenically unsaturated material which can be polymerized by free radicals, the free radical photoinitiator can likewise be present in an amount of 1 to 10% by weight, preferably 2 to 5% by weight.

Adhesive compositions which contain 2 to 5 parts of triarylsulfonium complex salt, about 10 parts of ethylenically unsaturated material and 0.2 to 0.5 part of free radical photoinitiator per 100 parts by weight of epoxide system have proved particularly suitable.

In the case of the free radical photoinitiators, it may be advantageous to use mixtures of various of these substances from one or several classes of substance. In individual cases, it may prove to be advantageous also to add sensitizers and/or coinitiators, for example, amines, such as ethanolamine, in order to intensify the initiator action in a known manner. However, these additions as a rule do not exceed the amount of free radical photoinitiator according to the invention.

In general, each of the two classes of photopolymerizable substance and its corresponding photoinitiator are used under the same considerations as when they are used alone. These include considerations of oligomer length, polymer molecular weight, relative amounts of initiator and photopolymerizable substance for any given selection of particular components, particular photoinitiators for a particular photopolymerizable compound, etc.

Other substances which are customary or known in the technology of radiation curable polymer materials can also furthermore be added, if appropriate, to the radiation curable adhesive according to the invention. These include, for example, substances which improve adhesion, substances which control viscosity and flow, dyestuffs, pigments and fillers. In particular, it is also possible, by adding thixotropic agents, such as, for example, pyrogenic silicic acid, to render the adhesive capable of being applied by silk-screen printing.

Starting, e.g., from the framework compositions given in the Examples, the expert can determine the adhesive compositions suited to his particular requirements without problems by varying the qualitative and quantitative composition and performing simple routine trials.

The radiation curable adhesives according to the invention are universally applicable and are particularly outstandingly suitable for gluing optical glass components, such as optical lenses and glass plates of liquid crystal display cells.

In the process according to the invention for gluing optical glass components, a thin layer of the adhesive, e.g., about 5 to 50 $\mu$m, thick, preferably about 10 $\mu$m thick, is introduced between the components to be glued, the components are brought together to fit as accurately as possible and partial hardening is carried out by irradiation, for example, with UV light or electron beams. The adhesive layer can be converted into a partially hardened state by, for example, irradiating with the UV light of a high pressure mercury lamp with a lamp output of 100 W for 5 to 20 seconds, preferably 10 to 15 seconds, and this state does not change over a relatively long period, but at least over 24 hours. The components to be glued are fixed with adequate mutual adhesion by this state, but nevertheless remain displaceable with respect to one another to a certain adequate degree. In this time span, it is possible to bring the components into their exact final position by fine adjustment in a simple manner.

When the adjustment has been made, the adhesive layer is then completely hardened to the final end strength by further irradiation over a period of not more than 2 minutes. The glued components can immediately be used further and require no after-hardening time. The gluing exhibits a high mechanical strength and resistance towards weathering influences, such as temperature and moisture, and towards the customary contents of liquid crystal fillings in liquid crystal display cells.

If, instead of the above, a commercially available UV-hardenable adhesive based on epoxy resin and a triarylsulfonium complex salt photoinitiator, to which no ethylenically unsaturated material and no free radical photoinitiator have been added, is introduced between 2 glass components and the system is treated in an analogous manner, the gluing hardens so rapidly after irradiation for 10 seconds that no further adjustment is possible. Gluing in the precise position is only possible if the components are brought together with the aid of precision devices before the hardening and are held in their exact end position during the irradiation.

In general, the particular wavelength of radiation employed for the initial partial hardening and for the final complete hardening will not be critical. Generally, the same wavelength can be used for each treatment. However, where both kinds of photopolymerizable substances have a very high sensitivity to a given wavelength, it may be necessary to select two different wavelengths, e.g., a somewhat less effective wavelength initially (i.e., one to which the adhesive is less sensitive) and a more effective one subsequently. Generally this will not be necessary since the two kinds of photopolymerizable compounds will generally have different sensitivities to a given wavelength.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A radiation curable adhesive contains
60 g of epoxycyclohexylmethyl 3,4-epoxycyclohexanecarboxylate
40 g of bisphenol A diglycidyl ether
3 g of triphenylsulfonium hexafluoroarsenate
10 g of oligomeric acrylated epoxy resin, and
0.3 g of 1-phenyl-2-hydroxy-2-methylpropan-1-one

EXAMPLE 2

A radiation curable adhesive contains
50 g of bis-(3,4-epoxy-6-methylcyclohexylmethyl) adipate
50 g of bisphenol A diglycidyl ether 2 g of 4-(phenylthio)-phenyldiphenylsulfonium hexafluoroantimonate
8 g of pentaerythtritol triacrylate
0.3 g of 2-(n-dodecyl)-thioxanthone

EXAMPLE 3

A radiation curable adhesive contains
100 g of 4-vinylcyclohexene dioxide
2 g of triphenylsulfonium hexafluorophosphate
10 g of oligomeric acrylated epoxy resin
0.5 g of benzoin ethyl ether

EXAMPLE 4

The radiation curable compositions according to Examples 1-3, are introduced in a layer about 10 μm thick between in each case 2 well-cleaned, degreased glass plates. Partial hardening is effected by irradiation for 10 seconds with a UV lamp (Osram Vitalux, lamp output 100 W) at a distance of 10 cm. Thereafter, the plates adhere firmly to one another without being able to shift relative to one another by themselves. Within 24 hours, the plates can now be moved relative to one another by several millimeters for adjustment. Complete hardening is then effected by exposure to the same lamp for 2 minutes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of gluing optical glass components comprising inserting an adhering effective amount of a radiation curable adhesive between the components,
the adhesive comprising effective amounts of an ionically photopolymerizable epoxide system and an ionic photoinitiator for the epoxide system and effective amounts of an ethylenically unsaturated compound which is photopolymerizable by free radicals and a free radical photoinitiator for the unsaturated compound,
exposing the adhesive to actinic radiation for a time sufficient for the adhesive to partially harden, but not fully harden, to an extent whereby the components are fixed to each other but remain displaceable with respect to one another, adjusting the components to achieve the desired orientation relative to one another, and then fully hardening the adhesive by exposing it to further actinic radiation for a sufficient time period.

2. A method of claim 1, wherein the actinic radiation is UV radiation.

3. A method of claim 2, wherein in the adhesive the ionic photoinitiator is of the triarylsulfonium complex salt type.

4. A method of claim 3, wherein the epoxide system comprises a low molecular weight epoxide, an oligomeric epoxide, a polymeric epoxide or a mixture thereof.

5. A method of claim 2, wherein the ethylenically unsaturated compound is a monomeric or oligomeric vinyl, acrylic or allyl compound or a mixture thereof.

6. A method of claim 5, wherein the free radical photoinitiator is benzophenone, hydroxyalkylphenone, dialkoxyacetophenone, benzoin ether, benzil ketal, thioxanthone or a mixture thereof.

7. A method of claim 5, wherein the unsaturated compound is methyl methacrylate, pentaerythritol triacrylate or an oligomeric acrylated epoxy resin.

8. A method of claim 5, wherein the free radical photoinitiator is benzophenone, 1-phenyl-2-hydroxy-2-methyl-propan-1-one, 1-(4,isopropylphenyl)-2-hydroxy-2-methyl-propan-1-one, 1-(4-chlorophenyl)-2-hydroxy-2-methyl-propan-1-one, 1-(4-dodecyclphenyl)-2-hydroxy-2-methyl-propan-1-one, diethoxyacetophenone, benzoin ethyl ether, benzil dimethyl ketal, 2-isopropylthioxanthone, 2-chlorothioxanthone or 2-dodecylthioxanthone.

9. A method of claim 5, wherein the weight ratio of the amount of ethylenically unsaturated compound to the amount of epoxide system is about 0.05 to 0.5.

10. A method of claim 9, wherein said ratio is about 0.1.

11. A method of claim 9, wherein the effective amount of each of the two photoinitiators is about 1-10% by weight based on the amount of respective substance to be photopolymerized thereby.

12. In an optical component comprising at least two optical glass elements glued together by a radiation cured adhesive, the improvement wherein the elements are glued together by the method of claim 1.

13. An optical component of claim 12, wherein the unsaturated compound is methyl methacrylate, pentaerythritol triacrylate or an oligomeric acrylated epoxy resin.

14. In an optical component comprising at least two optical glass elements glued together by a radiation cured adhesive, the improvement wherein the adhesive comprises amounts of an ionically photopolymerizable epoxide system and an ionic photoinitiator for the epoxide system and amounts of an ethylenically unsaturated compound which is photopolymerizable by free radicals and a free radical photoinitiator for the unsaturated compound, wherein said amounts are effective to adhere said glass elements together.

15. An optical component of claim 14, which is an electrooptical cell for a liquid crystal display.

16. An optical component of claim 14, wherein the unsaturated compound is methyl methacrylate, pentaerythritol triacrylate or an oligomeric acrylated epoxy resin.

* * * * *